(No Model.)

J. F. LE BEAU.
FILTER.

No. 330,907. Patented Nov. 24, 1885.

Witnesses:
Hallie H. Brown.
N. E. King.

Inventor,
John F. Le Beau
By Allison Hall His Atty.

UNITED STATES PATENT OFFICE.

JOHN F. LE BEAU, OF TOLEDO, OHIO.

FILTER.

SPECIFICATION forming part of Letters Patent No. 330,907, dated November 24, 1885.

Application filed February 4, 1885. Serial No. 154,938. (No model.)

*To all whom it may concern:*

Be it known that I, JOHN F. LE BEAU, a citizen of the United States, residing at the city of Toledo, Lucas county, Ohio, have invented a new and useful Improvement in Filters, of which the following is a specification.

My invention relates to that class of filters in which fluids are filtered both downward and upward, and its objects are to render such filter more efficient than heretofore, and to facilitate cleansing and repacking the same. I attain these objects by means of the device illustrated in the accompanying drawings, made part hereof, in which—

Figure 1:
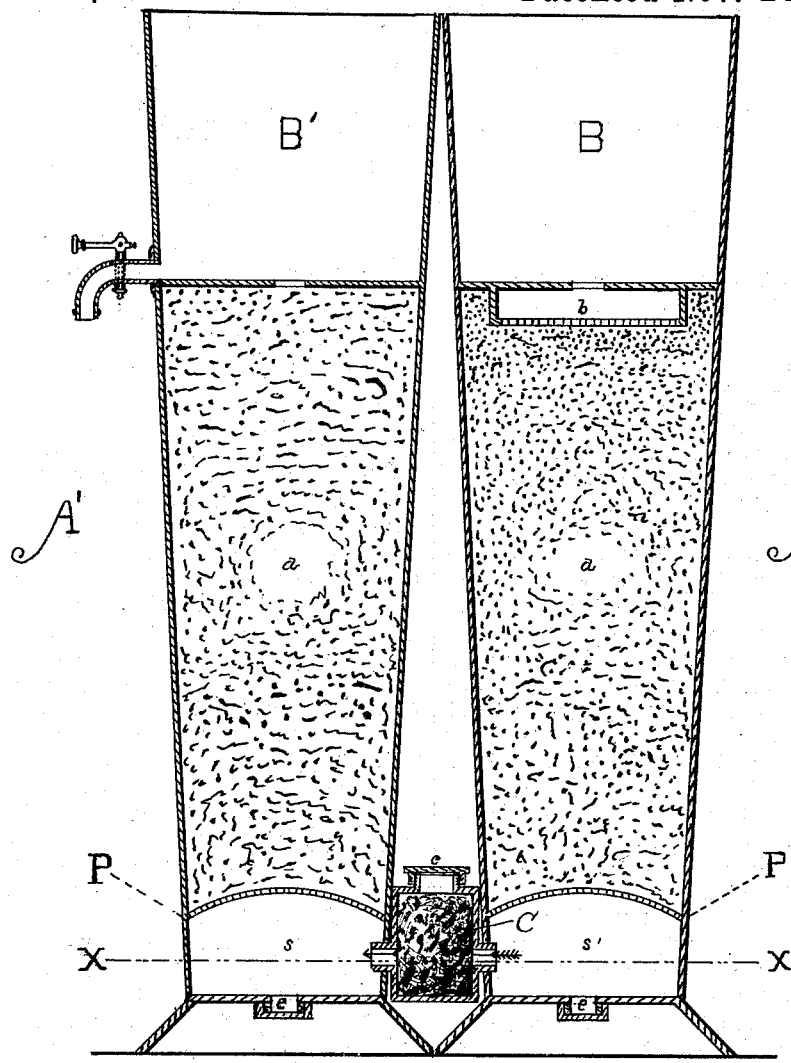
Figure 2:
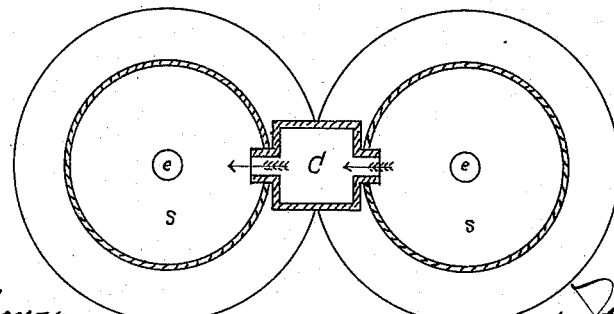

Figure 1 is a central vertical section of my device, and Fig. 2 a plan on line $x\,x$.

Corresponding letters represent the same parts in both views.

My filter is provided with two vessels, A and A', in one of which, A, the fluid is filtered downward and in the other, A', upward through filtering material $a$. The filtering material in each vessel rests upon perforated plates P, beneath which in each vessel is space $s$, which serves as a settling or sediment chamber. Vessels A and A' are connected by pipe or box C, its ends terminating and opening into chambers $s\,s$. Pipe C is designed to contain a sponge or other porous substance, thus forming an intervening horizontal filter, and is provided with an aperture large enough to admit of the easy removal of the sponge, so that it may be readily cleansed. This opening in C is closed by screw-cap $c$. Settling-chambers $s\,s$ are provided with cleansing-apertures $e\,e$, also closed with screw-caps. B is the impure-water chamber, provided with the usual perforated bottom and sponge-box, $b$. B' is the reservoir for filtered water, also having perforated bottom.

I am aware that settling-chambers in filters are not new, but heretofore they have been so arranged that the flow of water into or from the filter necessarily agitates the accumulated sediment, rendering the water in the settling-chamber turbid. My arrangement of settling-chambers $s\,s$, interposed between the two bodies of filtering material $a\,a$, and separated by horizontal filter C, fully obviates this difficulty, the water passing into and out of both settling-chambers by percolation only and so gently as to not disturb deposited sediment.

It is obvious that vessel A will require repacking with fresh filtering material much more frequently than vessel A'. In the ordinary downward and upward filter, in which all the filtering material is inclosed in one vessel, it is necessary when removing that portion of the filtering substance which has become foul to always handle all of the filtering material—a somewhat serious matter in repacking or moving large heavy filters. In my device this objection is obviated by removing the connecting sponge-holding pipe C, and disconnecting the two vessels A and A', thus dispensing with one-half the weight and bulk usually encountered in repacking.

What I claim as my invention, and desire to secure by Letters Patent, is—

1. Filters A and A', in combination with intervening sediment-chambers, $s\,s$, and connecting horizontal filter C, substantially as shown and described, for the purposes specified.

2. In a filter consisting of vessels A and A', intervening sediment-chambers, $s\,s$, and connecting-filter C, the cleansing device consisting of apertures $c$ and $e\,e$, arranged substantially as shown and described, for the purposes set forth.

JOHN F. LE BEAU.

Witnesses:
E. W. JOHNSTON,
H. W. BROWN.